US008262245B1

(12) United States Patent
Richmond

(10) Patent No.: US 8,262,245 B1
(45) Date of Patent: Sep. 11, 2012

(54) SOLAR PATHWAY LIGHT

(76) Inventor: Simon Nicholas Richmond, Princeton, NJ (US)

( * ) Notice: Subject to any disclaimer, the term of this patent is extended or adjusted under 35 U.S.C. 154(b) by 0 days.

(21) Appl. No.: 13/118,113

(22) Filed: May 27, 2011

Related U.S. Application Data

(60) Provisional application No. 61/396,580, filed on May 28, 2010.

(51) Int. Cl.
F21V 33/00 (2006.01)
(52) U.S. Cl. .......................................... 362/183; 362/152
(58) Field of Classification Search .................. 362/183, 362/152, 153, 153.1
See application file for complete search history.

(56) References Cited

U.S. PATENT DOCUMENTS

| 4,319,310 | A | * | 3/1982 | Kingsley | 362/183 |
|---|---|---|---|---|---|
| 4,441,143 | A | * | 4/1984 | Richardson, Jr. | 362/183 |
| 4,486,820 | A | | 12/1984 | Baba et al. | |
| 4,816,970 | A | | 3/1989 | Garcia, Jr. | |
| 4,841,416 | A | | 6/1989 | Doss | |
| 5,107,637 | A | * | 4/1992 | Robbins | 52/28 |
| D353,014 | S | | 11/1994 | Elazari | |
| 5,647,660 | A | | 7/1997 | Lee | |
| 6,662,492 | B2 | | 12/2003 | Oliver | |
| D529,655 | S | | 10/2006 | Allsop et al. | |
| 7,310,901 | B1 | | 12/2007 | Estes | |
| D566,857 | S | | 4/2008 | Doyle | |
| 7,661,838 | B2 | | 2/2010 | Chen | |
| 2007/0002561 | A1 | * | 1/2007 | Tesmer et al. | 362/183 |
| 2007/0274066 | A1 | * | 11/2007 | Lodhie et al. | 362/183 |
| 2008/0232094 | A1 | * | 9/2008 | Ramsdell | 362/153 |

* cited by examiner

Primary Examiner — Laura Tso
(74) Attorney, Agent, or Firm — Volpe and Koenig, P.C.

(57) ABSTRACT

The present invention relates to a device for providing solar outdoor lighting including a generally U-shaped support pole. The support pole free-ends are spaced apart and attached to a base or substrate connected together by an upper joining section which connects orients and spaces apart the pole supports. Connected to the upper joining section is an electrical light source that is directed downward through a lens suspended below the joining section. Below the lens and above the base or substrate is a housing that includes the solar panel, a rechargeable battery, charging and illumination control circuitry, and activation circuitry to turn on the light at low ambient light levels. The support pole forms a safety barrier for the light source and solar panel from knocks while providing at least two poles for attached to a base or substrate. The present invention further relates to a water-resistant customer activation structure.

25 Claims, 10 Drawing Sheets

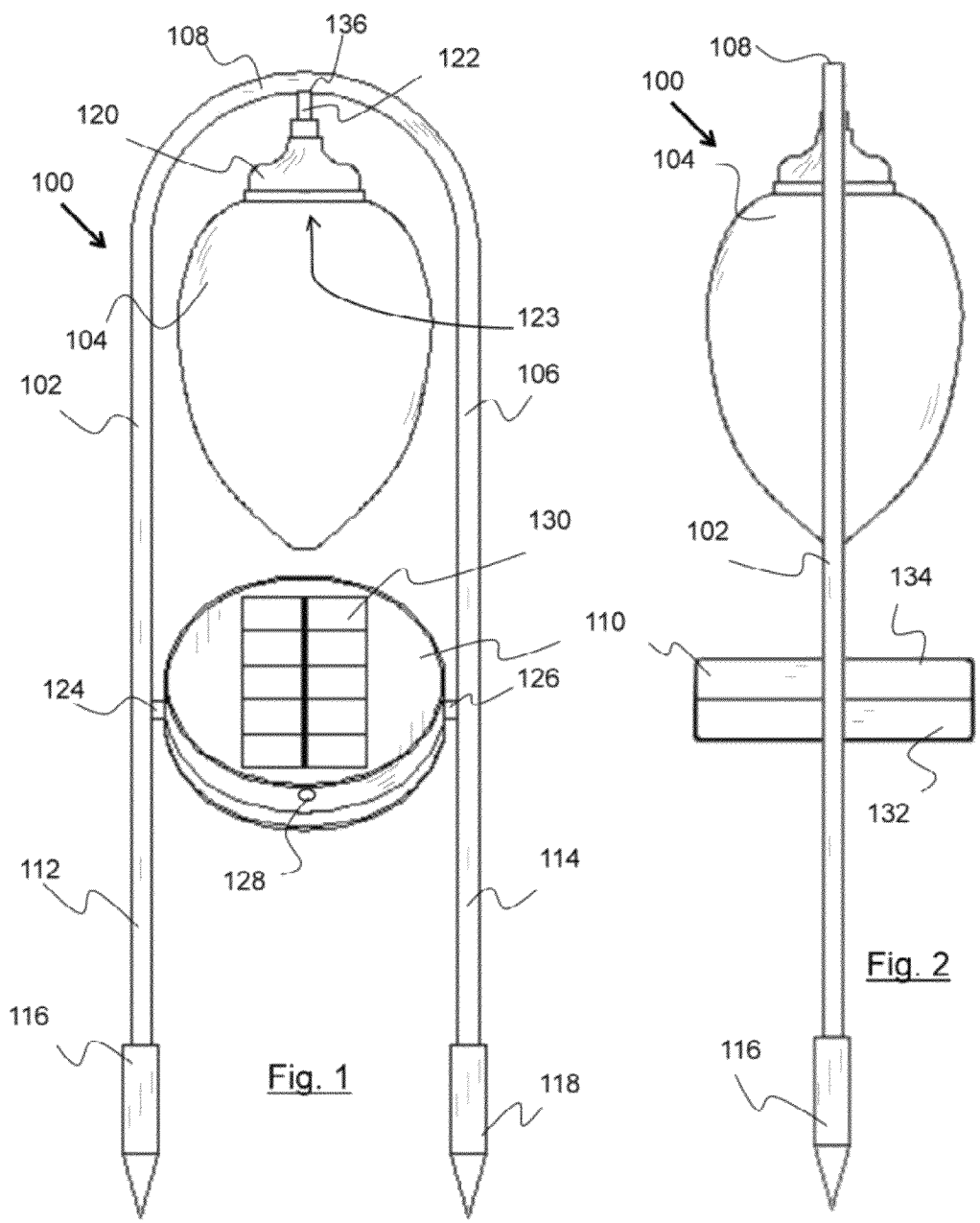

SOLAR PATHWAY LIGHT

CROSS REFERENCE TO RELATED APPLICATION(S)

This application is related to, and claims priority from, U.S. Provisional Patent application No. 61/396,580 filed on May 28, 2010 entitled "Solar Pathway Light", the contents of which are hereby incorporated by reference.

BACKGROUND OF THE INVENTION

Field of the Invention

This invention relates generally to outdoor lighting devices, and, more specifically, to solar-powered outdoor lighting devices.

BRIEF SUMMARY OF THE INVENTION

Briefly described, it would be desirable to provide a solar-powered pathway light that provides functional pathway lighting, while being aesthetically pleasing, and that has an improved stability when supported by a ground substrate.

DISCUSSION OF THE PRIOR ART

Outdoor lighting can provide an important accent to any yard or garden. A gardener or landscaper may strategically place many lights in a landscape to illuminate walkways to enhance safety and create aesthetic appeal. Some lighting devices are designed to simply provide light while in others the lights themselves serve ornamental purposes even when they are not illuminated.

Due to the relative high cost per watt of photovoltaic panels, most designers of solar powered domestic pathway solar light designers employ high efficiency light sources such at least one light emitting diode (LED). Light emitting diodes (LEDs) are directional light sources and accordingly are usually positioned inside a solar powered path light such that the LED source directed downward with a beam angle and light diffuser designed to spread the light downwards to functionally illuminate a pathway ground region. In addition, to maintain a relatively lower power consumption and thus maintain the battery charge for several hours, the height of the LEDs above the ground in a solar power pathway light is usually no more than two feet.

However, prior devices interfere with the secondary aesthetic purpose of the lighting device. The solar cells are prominently mounted to the top or sides of the lighting element and are therefore visible during daylight hours. As time passes, mineral deposits and fading often discolor the surface covering of the photovoltaic cell. Ultimately, the photovoltaic cell 130 distracts from any ornamental qualities the lighting device was designed for.

Due to the relative high cost per watt of photovoltaic panels, solar powered garden pathway lights are usually designed to operate at the highest efficiency with their photovoltaic panels prominently mounted to the top or sides of the light assembly so as to avoid shading of a part of the photovoltaic panel caused by another part of the light assembly. This results usually results in a flat upper surface of the solar light assembly with that upper surface being closest to a daylight observer walking past and viewing the solar light downward from an acute angle to the vertical. This results in an aesthetically unattractive design.

Ornamental solar lights also exist where the primary use is decoration or accent lighting. With these lights the diffuser is often made of glass and is positioned at the top of the solar light assembly with a solar panel positioned a distance below the diffuser and offset to reduce a shadowing of the solar panel by the diffuser at different times during the day. However, the light source in such embodiments is directed upwards towards the diffuser and away from the ground and thus provides little functional light for illuminating the ground surface of a pathway. Further, since the diffuser is made of a heavy glass on the end of an extended pole portion and thus resulting in a high center of gravity, there is a high propensity for the fixture to be knocked over and the glass diffuser to be damaged by impact with a ground surface.

In view of the foregoing, it would thus be desirable to have a solar powered pathway light that provides functional pathway lighting, while being aesthetically pleasing without an unattractive upper solar panel, and that has an improved stability when affixed into a ground substrate. The present invention over comes the above problems and provides these improved features and benefits.

SUMMARY OF THE INVENTION

The present invention relates to a device for providing solar outdoor lighting including a generally U-shaped support pole. The support pole free-ends are spaced apart and attached to a base or substrate connected together by an upper joining section which connects orients and spaces apart the pole supports. Connected to the upper joining section is an electrical light source that is directed downward through a lens suspended below the joining section. Below the lens and above the base or substrate is a housing that includes the solar panel, a rechargeable battery, charging and illumination control circuitry, and activation circuitry to turn on the light at low ambient light levels. The device includes safety barrier features to protect the light source and solar panel from knocks while providing at least two poles for attached to a base or substrate. The present invention further relates to a water-resistant customer activation structure.

BRIEF DESCRIPTION OF THE DRAWINGS

A preferred embodiment and alternative embodiments of the present invention will now be described by reference to the accompanying drawings in which, as far as possible, like numbers represent like elements.

FIG. 1 is a first perspective view of a first embodiment lighting device, in accordance with the present invention;

FIG. 2 is a side perspective view of the embodiment shown in FIG. 1. in accordance with the present invention;

DETAILED DESCRIPTION

Figure 3:
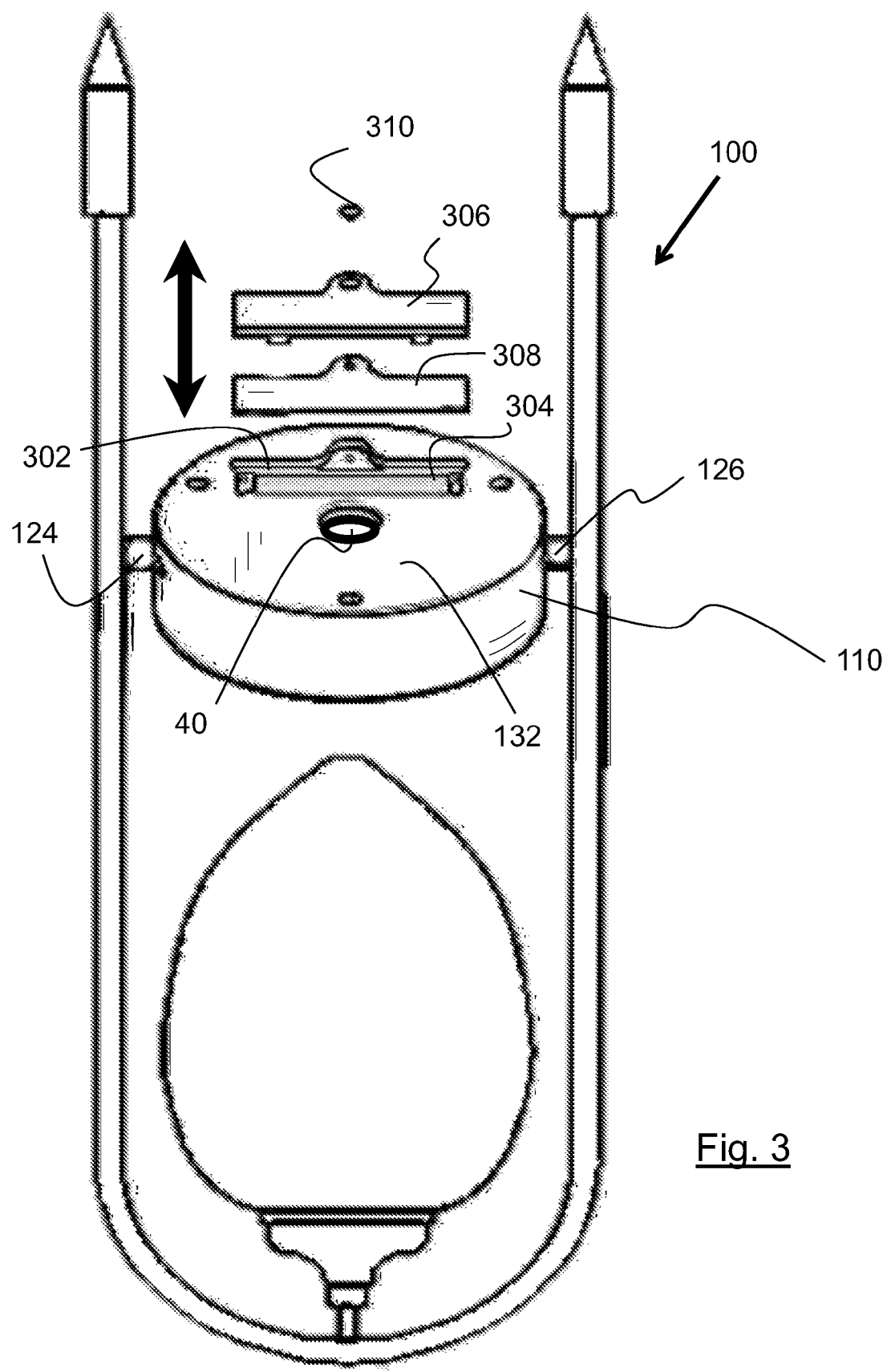
FIG. 3 is a below perspective view of the embodiment shown in FIG. 1 with an exploded view of the rechargeable battery compartment, in accordance with the present invention.

The present invention comprises a device for providing outdoor lighting including a first and second vertically-oriented pole supports having upper region and lower regions. The pole supports are connected via an at least partially horizontal upper joining section which is adapted to connect, orient and space apart the pole supports. Preferably the first and second pole supports and joining section are formed from a single piece of metal bent into an arc at the joining section region. Connected to the upper joining section is an electrical light source, preferably at least one light emitting diode (LED) that is directed downward. A lens or diffuser is suspended below the joining section. The lens may be in the shape of an at least partially hollow sphere, orb or other suitable shape and may be constructed of glass, plastic, resin or other suitable light transmissive material. The LED is positioned such that light emitted by the LED is directed downward through a cavity in the lens and outward through the lens.

It should be noted that the reference to lens as used throughout references generally to a light translucent device that may or may not have light directing features and may be broadly considered to include devices commonly referred to as shades as well without departing the invention.

Below the lens and mounted between a lower portion of the first and second pole supports is a housing that contains at least one solar panel, at least one rechargeable battery, charging and illumination control circuitry, and activation circuitry to turn on the Led at low ambient light levels. The solar panel is preferably mounted proximate to an upper surface of the housing so as to receive light.

The control circuitry and activation circuitry are connected such that the rechargeable battery accumulates charge when the solar panel is exposed to ambient light level of sufficient intensity and that when the activation circuit detects ambient light lower than a predetermined level, the control circuitry connects the LED and the rechargeable battery such that the LED emits light downward towards and around the solar panel. When illuminated at night, the light emitted via the lens is at least partially reflected by the upper surface of the housing to partially illuminate a lower surface of the lens.

In general, a lighting device may comprise at least one generally inverted-U-shaped support comprising free-ends spaced apart and attached to a base having generally vertical riser sections connected together by an upper joining section which connects orients and spaces apart the support free ends. A light assembly is suspended below the upper joining section of the generally inverted U-shaped support and suspended between the riser sections. A power supply assembly includes a housing positioned between the light assembly and the base, at least one photovoltaic panel mounted proximate to an upper surface of the housing so as to receive sunlight, and at least one rechargeable battery. The light assembly and the power supply assembly are electrically connected and arranged such that the emitted light from the light assembly illuminates a portion of the upper surface of the housing during night-time use.

The light assembly includes an at least partly light-transmissive lens suspended below an upper portion of the generally inverted U-shaped support and suspended between the riser sections; at least one light source electrically connected to the power supply assembly; wherein emitted light from the light source is directed substantially downwards through a portion of the lens; and wherein the emitted light is at least partially reflected by the upper surface of the housing to redirect some reflected light upwards towards a downward-facing surface of the lens. The lens includes an at least partially convex upper surface and a lower opposing surface forming an at least partially enclosed cavity. The housing has electrical elements connected to the at least one light source via at least one of the substantially vertical riser portions.

In one embodiment, the housing laterally connects to both of the substantially vertical riser portions to provide lateral structural support to the lighting device either directly or via a lateral member.

The housing is at least partly rotatable relative to either a vertical or horizontal axis to adjust the angle of the at least one photovoltaic panel relative to the direction of sun light.

The generally inverted U-shaped support may be substantially comprised of a single tube of metal bent into an arch and electrical leads pass through a hollow interior of the tube between the light assembly and the power supply assembly.

The lighting device free-ends may include tip portions attached to the tube.

The generally inverted U-shaped support may be substantially comprised of a substantially vertically-oriented first support pole; a substantially vertically-oriented second support pole substantially parallel to the substantially vertically-oriented first support pole; a substantially horizontal cross support pole connecting the substantially vertically-oriented first support pole and the substantially vertically-oriented second support pole; such that the lens is suspended below the substantially horizontal cross support pole.

The control circuit includes a light-sensing sub-circuit connected such that the at least one rechargeable battery accumulates electrical charge when the photovoltaic panel is exposed to ambient light level of sufficient intensity; and a light-activation sub-circuit wherein when the light sensing sub-circuit detects ambient light lower than a predetermined level, the control circuit connects the rechargeable battery and the light source via an electrical connection such that the at least one light source emits light downward towards and around the at least one photovoltaic panel and wherein the light-activation sub-circuit includes a light sensitive resistor that is shielded from the emitted light.

The light assembly may be flexibly suspended below the upper portion and is at least partially movable relative to the support.

The housing may further include an access region comprising a slotted aperture for a pull tab, and a cap to cover the access region to provide a substantially water-resistant seal between the cap and the access region when the cap is mated to the access region. The access region may comprise a switch. The cap includes a tether connected to the housing.

In should be noted that the base may be displaceable substrate and the tips are adapted to penetrate and anchor to the substrate.

A bird cage effect surrounding the light assembly may be achieved from a plurality of supports connected at a central connection point of their upper joining sections.

The lighting device may include a lateral member connected between the riser sections and below the light assembly.

It will be appreciated by those skilled in the art that (1) the support, (2) at least two of the free-ends connected to the base, (3) the lateral member and (4) movement of the light assembly relative to the support, each and in any combination thereof, provides the lighting device with a capability to sustain an impact with reduced damage and displacement and in effect provides a safety barrier from being kicked or hit with children's toys, such as balls, or lawn mowers and the like. For example, the movement of the lighting assembly when between the two vertical supports displaced the assembly when hit by for example a ball while the vertical supports when spaced apart at a distance less than the diameter of the ball would effectively stop it from advancing further. By having at least to posts in the ground, displacement of the light device from or relative to the ground is minimized.

Referring to FIG. 1, a lighting device 100 may include a first support post having a first upper support 102 and a first lower support post 112, a second support post having a second upper support post 106 and a second lower support post 114 with a connection frame 108 therebetween thus providing rigidity, support and spacing for the lighting device 100. The support posts 102 and 106 may be straight, curved, or sloped, or have a non-deterministic ornamental shape. Suspended below the connection frame 108 is a lens frame 120 supporting a lens 104.

The lens frame 120 is preferably made from plastic but may be manufactured from other suitable material such as stamped, cast, or milled metal. The lens frame 120 supports the lens 104 via fastening means that may include glue, adhesive, spring clips, tabs, press-fit, rotational flanges or other suitable means. As detailed in FIG. 9, the preferred means of fastening the lens 104 to the lens frame 120 is using spring clips 804 and 806 that are bent downwards to insert the clips 804 and 806 into a lens aperture 802 of the lens 104 which has a diameter narrower then the diameter of the fully opening spring clips. As the lens 104 is pushed upwards toward the lens frame 120, the spring clips 804 expand to their relaxed position inside the lens 104 holding the lens 104 in place against the lens frame 120. The lower perimeter of the lens frame preferable is wider than the lens aperture 802 in the lens 104 to reduce rain and moisture ingress into the lens 104 during use. A drain hole in a lower extremity of the lens 104 may be drilled or molded to allow the egress of water from with the lens 104 that may built up from seepage or condensation.

Figure 9:
FIG. 9 is a second perspective view of the third embodiment FIG. 8, showing a partially unassembled state, in accordance with the present invention.

Preferably the lens 104 is made of glass having a design such as a stencil pattern to direct light on the ground in a decorative pattern. An example of such a design or color scheme is shown in FIG. 9. Alternatively the lens 104 may be made of crackle, blown, injected, mosaic or borosilicate glass. Alternatively the lens 104 may be made of resin, plastic or other suitable material. Preferably the lens is light transmissive or it may be made on non-light transmissive material but have apertures to facilitate the exit of light. The lens 104 is preferably symmetrical about the vertical axis and may be formed on the shape of a sphere, orb or other suitable shape.

Disposed proximate to the lens frame 120 to direct light outwards through the lens 104 is an electrical light source 123 (shown in FIG. 9) The electrical light source is preferably at least one light emitting diode (LED) having a wide beam angle. Several light sources may be used for increased brightness or colored light effects.

The insulated wiring forming part of the lens suspender 122 supplies power to the light source 123 up through or along one of the upper support posts 112 or 106 from a housing 110 mounted below the lens between the first lower support post 112 and the second lower support post 114.

Figure 4:
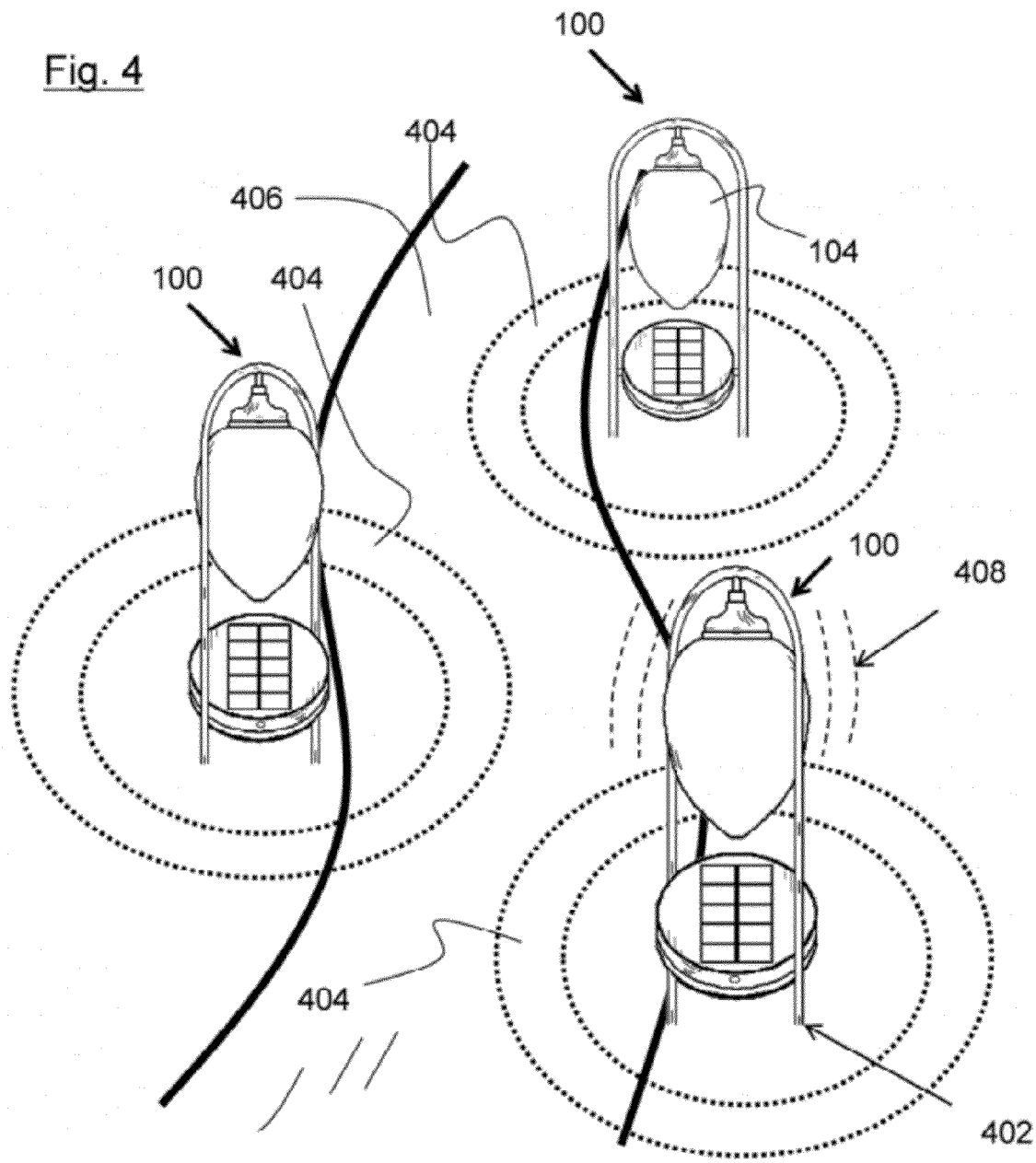
FIG. 4 is a perspective view of multiple devices in situ in accordance with the embodiment shown in FIG. 1, in accordance with the present invention.
Figure 5:
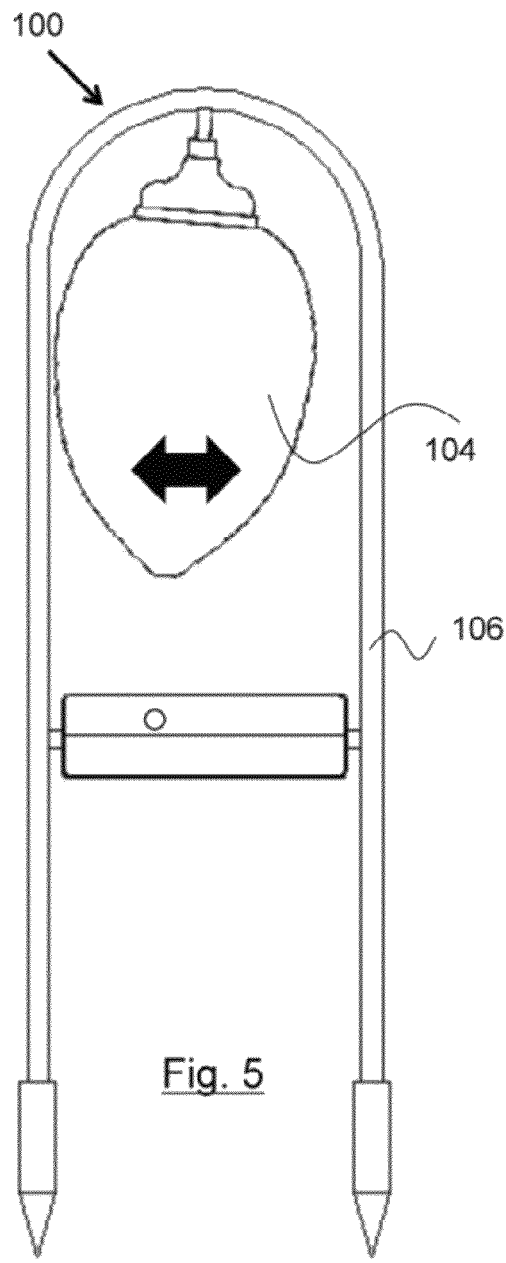
FIG. 5 is a front view of the embodiment shown in FIG. 1. showing the lens in a first alternate position, in accordance with the present invention.
Figure 6:
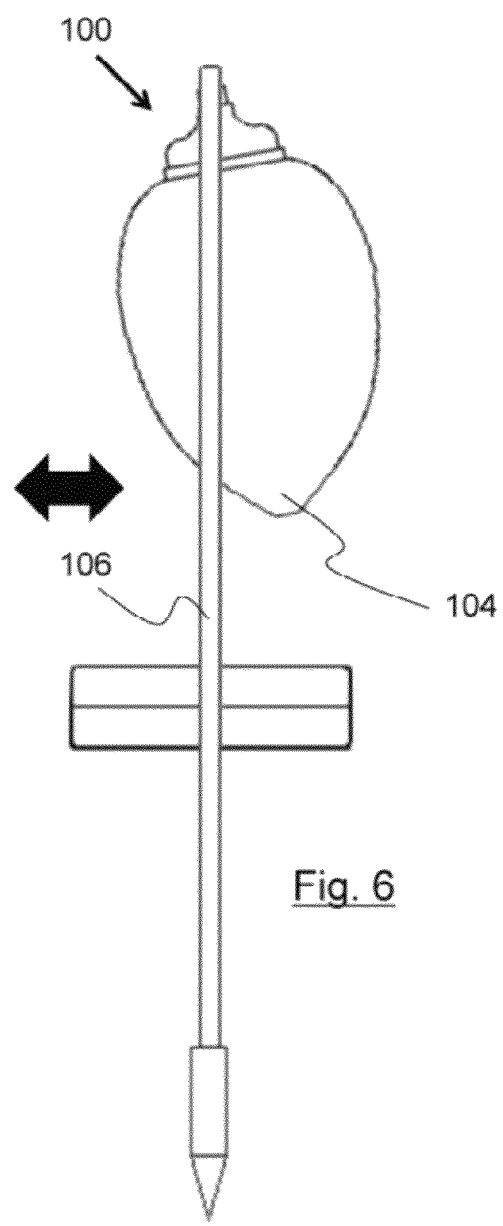
FIG. 6 is a side view of the embodiment shown in FIG. 1. showing the lens in a second alternate position, in accordance with the present invention.
Figure 7:
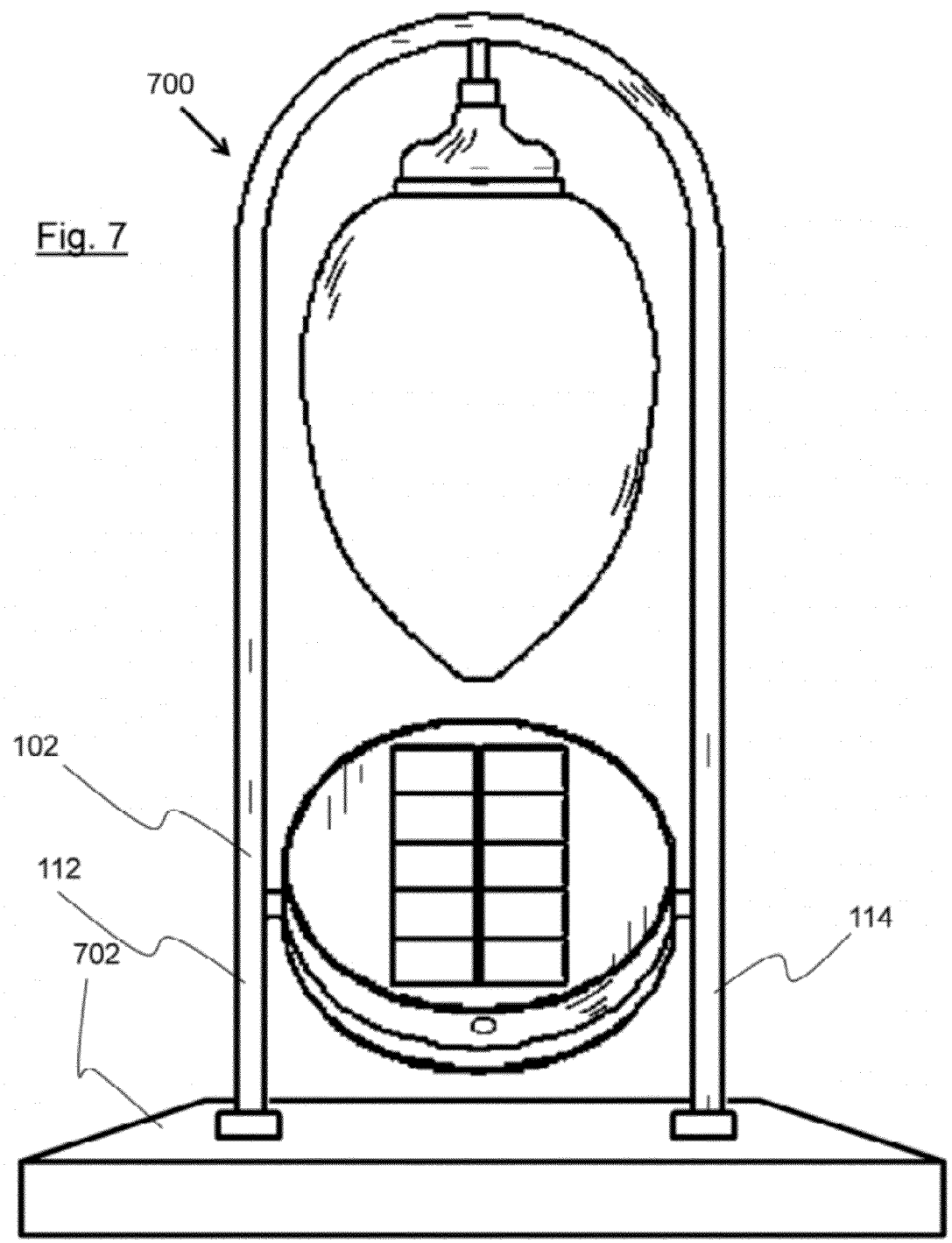
FIG. 7 is a perspective view of a second embodiment of the lighting device, in accordance with the present invention.

As shown in FIG. 4, the lower end of the first and second lower support posts 112 and 114 typically insert into the ground substrate 402 or other substrate and have sharpened tips 112 and 114 to facilitate insertion. The sharpened tips 116 and 118 are either integrally formed with the lower end of the first and second lower support posts 112 and 114 or secured by threads, press-fit, weld, or like attachment means. In other embodiments, the lower end of the first and second lower support posts 112 and 114 may be supported by a broad-based stand 702 included in a lighting device 700 (as shown in FIG. 7) or other structure that simply rests on the substrate. Such a support mechanism may be used when, for example, the lighting device 100 is placed on a wooden deck or cement patio where insertion is not practicable.

Preferably the lighting device includes a first and second vertically-oriented pole supports having upper and lower regions. The pole supports are connected via an at least partially horizontal upper joining section which is adapted to connect, orient and space apart the pole supports. Preferably the first and second pole supports and joining section are formed from a single piece of metal bent into an arc at the joining section region 108. Connected to the upper joining section 108 is an electrical light source 123, preferably at least one light emitting diode (LED) that is directed downward. An at least partially transparent or translucent lens 104 or diffuser is suspended below the joining section 108. The lens 104 may be in the shape of an at least partially hollow sphere, orb or other suitable shape and may be constructed of glass, plastic, resin or other suitable light transmissive material. It will be appreciated by those skilled in the art that the lens, while preferably hollow, may not be hollow, but formed around said light source as a solid formation of resin and additionally other materials including combinations of plastic, glass, wood, fiber glass or metal can be used. The lens 104 may be formed from a wire and/or plastic frame to simulate a woven natural material such as rattan or wicker. The lens 104 may have one or more apertures to facilitate emission of light generated by the light source 123. The LED is positioned such that light emitted by the LED 123 is directed downward through a cavity in the lens 104 and outward through the lens 104.

Below the lens 104 and mounted between a lower portion of the first 112 and second 114 pole supports via a horizontal first housing support 124 and a second housing support 126 is a housing 110 that contains at least one photovoltaic or solar cell 130, at least one rechargeable battery 304, charging and illumination control circuitry, and activation circuitry to turn on the LED 123 at low ambient light levels. The photovoltaic cell 130 is preferably mounted proximate to an upper surface of the housing 100 so as to receive ambient light from both around and through light-transmissive portions of the lens 104. Electrical wiring passes from circuitry within the housing 110 through at least one of the first housing support 124 or second housing support 126 and up through at least the hollow first upper support post 102, the connection frame 108 and down through a frame aperture 136 via the lens suspender 122 to the light source 123 disposed on the lens frame 120. The upper support posts 124 or 126 may be solid with no hollow region with electrical wiring passing along one or both of the support posts 124 and 126.

Alternatively, the wiring may extend directly from the body of the housing 110, and not pass through either the housing first support 124 or the housing second support 126 and may wrap around the exterior of the first upper support post 102.

The control circuitry and activation circuitry are connected such that the rechargeable battery 304 accumulates charge when the photovoltaic cell or cells 130 are exposed to ambient light level of sufficient intensity and that when the activation circuit detects ambient light lower than a predetermined level, the control circuitry connects the LED 123 and the rechargeable battery 304 such that the LED 123 emits light downward towards and around the photovoltaic cell 130 proximate to the upper surface of the housing 110. When illuminated at night, the light emitted via the lens 104 from the LED 123 is at least partially reflected by the upper surface of the housing 134 to partially illuminate a lower surface of the lens 104. The photovoltaic cell 130 is preferably made from amorphous silicon with a smooth protective light-transmissive upper layer such as glass. At night, some light emitted by the lens 104 will be reflected back from the smooth glass surface of the glass covering the photovoltaic cell 130. Alternatively the solar panel 130 may be constructed from crystalline solar panels. The photovoltaic cell 130 may be covered in a light transmissive material such as plastic or glass. Because crystalline solar cells operate at higher peak efficiency in direct sunlight and poor efficiency in indirect sunlight, the crystalline cells would likely be separated to reduce shadowing by the lens 104. Use of an amorphous silicon cell would be more suitable compared to crystalline cells because the amorphous cell can better utilize indirect ambient light received through the light transmissive portions of the lens 104 during daylight hours. Further, as shown in FIG. 1 compared to the housing position in FIG. 2, the housing 110 is partially rotatable about the housing first support 124 and housing second support 126 to further facilitate orientation of the photovoltaic cell 130 when the opportunity for direct sunlight angle arises such as in the winter months when the sun is at a lower angle in the temperate latitudes.

Figure 10:
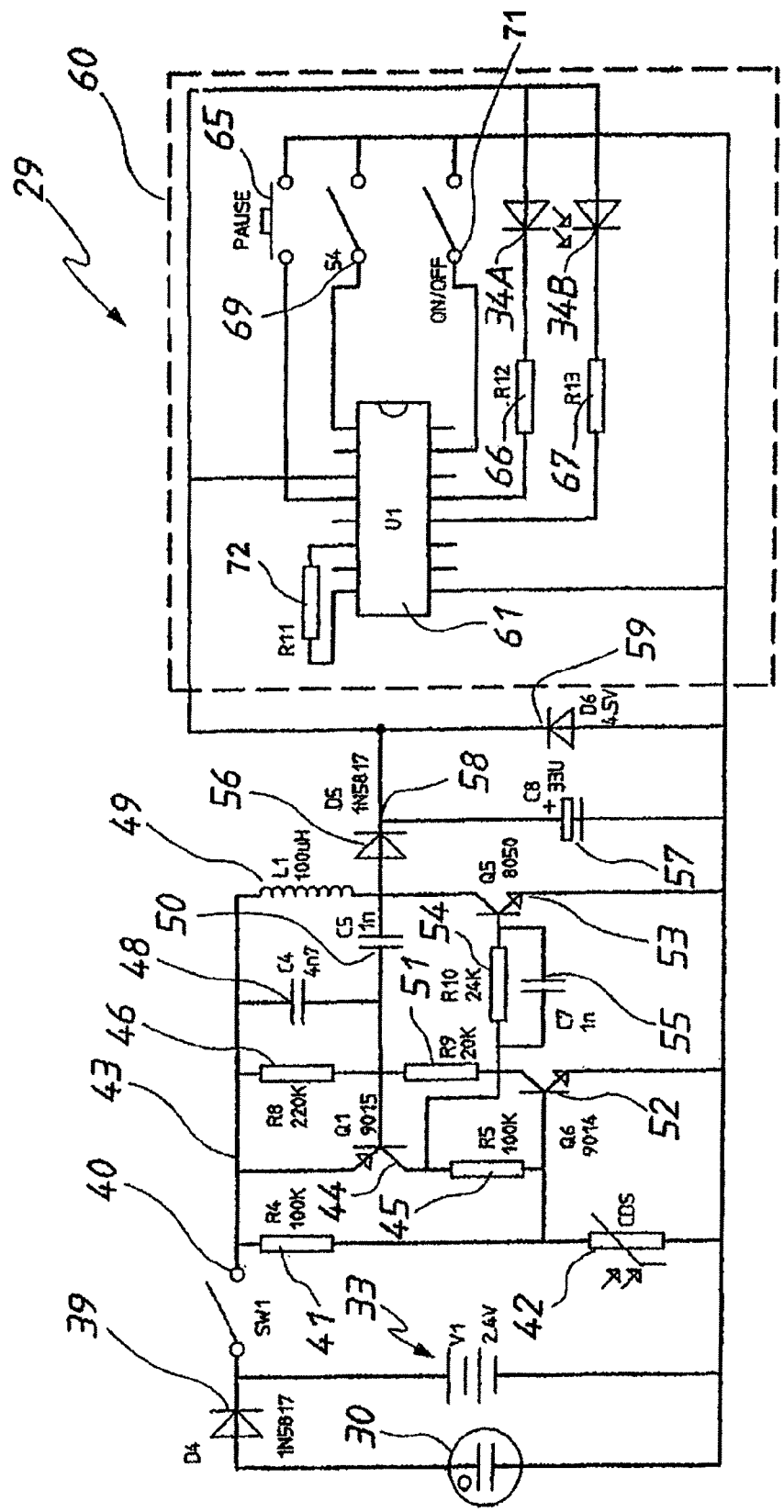
FIG. 10 is an electrical schematic of the embodiment shown in FIG. 1, in accordance with the present invention.

Disposed within the housing 110 is a rechargeable power source 304 which is recharged by the photovoltaic cell 130. In the preferred embodiment 100 a rechargeable power source of the type suitable for this purpose comprises a AA size 700 mA/hour nickel cadmium battery 304 as shown in FIG. 3. Alternatively, other rechargeable power sources may be used including one or more nickel metal hydride batteries, rechargeable alkaline batteries, lead acid batteries, lithium ion batteries or similar rechargeable devices. Access to the battery 304 for replacement is through a user accessible battery compartment 302 located on the underside of the housing 110. This battery compartment 302 is accessed by removing a security screw 310 from the battery compartment cover 306, removing the battery compartment cover 306 and the waterproofing compartment silicon gasket 308 that is disposed between the battery compartment cover 306 and the battery compartment 302. A power supply circuit connects the photovoltaic cell 130 in series to a forward based diode, which is in turn connected to a positive terminal of the battery 304. A negative terminal of the battery 304 is then connected to the photovoltaic cell 130 to complete a power supply circuit. In the example shown herein, the diode may be a model number IN5817 Schottky diode 39 (as shown in FIG. 10). It will be apparent to a person skilled in the art that other diode and battery configurations may be utilized without departing from the spirit and scope of the invention. When the photovoltaic cell 130 is exposed to sufficient light, the photovoltaic cell 130 converts some of the solar energy to electrical energy and creates a current that passes through the diode 39 to charge the battery 304. Thus, during the day the photovoltaic cell 130 converts energy from the sun to charge the battery 304. The diode prevents the battery 304 from expending any power on the photovoltaic cell 130.

Located within the housing 110 is the control unit which may be arranged to sense the ambient light level, for example, in the present example, an ambient light sensor 128 in the form of a light-dependent cadmium sulfide resistor is located in location on the housing 110 that is exposed to ambient light but shielded from light produced from the light source 123, and if a determination is made by the circuit that insufficient ambient light is available, a connection is made between the battery 304 and the electrical light source 123. An example of a circuit used in the control unit is shown in FIG. 10. If a determination is made that sufficient ambient light is available, a connection is not made between the battery 304 and the electrical light source 123 and current does not flow from the battery 304. Specifically, the positive terminal of the battery 304 is connected to a user accessible switch 40 shown in FIGS. 3 and 10 which is in turn connected to a 100 kΩ first resistor 41 as also shown in FIG. 10. The first resistor 41 is connected in series with a second, light dependent resistor 128 as seen in FIG. 1. The second resistor 128 connects to the negative terminal of the battery 304 to complete the lighting circuit. The value of resistance of the second resistor 128 depends upon the amount of light to which the second resistor 128 is exposed. When there is not much light, such as occurs at night, the value of the second resistor 128 increases. During the daytime, when there is sufficient ambient light, the value of the second resistor 128 decreases. Accordingly, the resistor 128 allows the lighting circuit to operate only when there is insufficient light, i.e. at night. Other suitable equivalent circuits to activate the circuit at low levels may be utilized including measuring the current generated by the photovoltaic cell 130 and activating the circuit when the current drops below a predetermined level.

With continued reference to FIG. 10, the battery 33 powers the light circuit 60 during the night to produce light of varying colors and/or patterns and the user can optionally select a desired color or pattern by pushing the push button 65. A selected color or pattern is retained by memory in the IC 61. The memory may be a switch. Whilst the battery is powering the light circuit 60, the fourth capacitor 57 stores charge. As stated above, it is desirable for a selected color to be retained and displayed on successive nights. As the battery 33 discharges, the output voltage of the battery 33 decreases. When the output voltage of the battery 33 is less than the stored voltage of the capacitor 57, the capacitor 57 discharges. Due to the presence and arrangement of the diodes 56 and 59, the capacitor 57 discharges through the light circuit 60.

With reference to FIG. 10, the power supply circuit is connected in parallel to the light operated circuit, which is connected across the terminals of the battery 33. The positive terminal of the battery 33 is connected to a switch 40, which is in turn connected to a first resistor 41. The first resistor 41 is connected in series with a second, light-dependent resistor 42. The second resistor 42 connects to the negative terminal of the batteries 33 to complete the light operated circuit. The value of resistance of the second resistor 42 depends on the amount of light to which the second resistor 42 is exposed. When there is not much light, such as occurs during the night, the value of the second resistor 42 increases. During the daytime, when there is sufficient light, the value of the second resistor 42 decreases. Accordingly the resistor 42 allows the lighting device to operate only when there is insufficient light, ie night.

The boost-up circuit is connected to the light operated circuit, in parallel with the first resistor 41 and the second, light-dependent resistor 42. A first circuit node 43 is defined between the switch 40 and the first resistor 41. Connected to the node 43, is an emitter terminal of a first triode 44. A collector terminal of the first triode 44 is connected in series with a third resistor 45. The third resistor 45 is then connected to a point between the first resistor 41 and the second resistor 42.

A fourth resistor 46 is connected to node 43 across the emitter and base terminals of the first triode 44. In parallel with the fourth resistor 46, and also connected across the emitter and base terminals of the first triode 44, is a first capacitor 48. Further connected to node 43, across the emitter and base terminals of the first triode 44 and in parallel with each of the fourth resistor 46 and the first capacitor 48, is an inductor 49 in series with a capacitor 50. The second capacitor 50 is then connected to the base terminal of the first triode 44.

A fifth resistor 51 is connected across the base and collector terminals of the first triode 44. Connected across the terminals of the third resistor 45 are the collector and base terminals, respectively, of a second triode 52. The emitter terminal of the second triode 52 is connected to the negative terminal of the batteries 33.

Connected between the inductor 49 and the second capacitor 50 is the collector terminal of a third triode 53. The base terminal of the third triode 53 is connected via an intermediary circuit to the collector terminal of the second triode 52. The intermediary circuit consists of a fourth resistor 54 in parallel with a third capacitor 55. The emitter terminal of the third triode 53 is connected to the negative terminal of the battery 33.

Also connected between the inductor 49 and the second capacitor 50 is the rectifier circuit. A forward biased second diode 56 is connected to a point between the inductor 49 and the second capacitor 50, and then to a positive terminal of a fourth capacitor 57. The negative terminal of the fourth capacitor 57 is connected to the negative terminal of the battery 33. A second circuit node 58 is defined between the second diode 56 and the fourth capacitor 57. Connected in parallel with the fourth capacitor 57, between the second node 58 and the negative terminal of the battery 33 is a reverse biased third diode 59. The second diode 56, the fourth capacitor 57 and the third diode 59 comprise the rectifier circuit. Further connected to the second circuit node 58, in parallel with each of the capacitor 57 and the reverse diode 59, is a light circuit 60.

The light circuit 60 contains an integrated circuit (IC) 61 for controlling lighting effects provided by the lighting device 100. In the embodiment shown, the IC 61 is a 16-pin, LED IC for controlling first and second light emitting diodes (LEDs) 34A, and 34B. Each of pins 1 and 15 is connected in series to respective switches 69 and 71. Each of the switches 69 and 71 is then connected to the negative terminal of the battery 33. In a further embodiment, the switches 69, and 71 determine the intensity of light emitted by each of the LEDs 34A and 34B. Various combinations of the frequency and intensity of light are also possible. The switches 69 and 71 can be made accessible to a user to create custom lighting effects. Alternatively, the switches 69 and 71 are set according to a predetermined configuration and are not readily accessible by a user.

Pin 4 of the IC 61 enables an optional pause function. In this embodiment, pin 4 connects to a push button 65 that is, in turn, connected to the negative terminal of the batteries 33. Pin 3 of the IC 61 connects to the second circuit node 58.

Connected to the second circuit node 58, and in parallel with one another, are the first and second forward biased light emitting diodes (LEDs) 34A and 34B. The first LED 34A is connected in series with a sixth resistor 66 that is connected to pin 13 of the IC 61. The second LED 34B is connected in series with a seventh resistor 67 that is connected to pin 12 of the IC 61.

Pins 6 and 8 of the IC 61 are tied to one another via an eighth resistor 72. The valve of the eighth resistor 71 determines the frequency of a lighting effect created by the IC 61. Pin 9 of the IC 61 is tied to the negative terminal of the battery 33.

During the day, the solar cell 30 charges the battery 33. The value of the second resistor 42 is low and, consequently, small amounts of current flow through the boost-up circuit, rectifier circuit and light circuit. As night falls, the amount of energy converted by the solar cell 30 decreases. The resistance of the second resistor 42 increases and more current flows into the boost-up circuit, rectifier circuit and light circuit. This activates the LEDs 34A and 34B in the light circuit.

Connecting the optional pause function of pin 4 of the IC 61 to the push button 65 enables a user to stop the changing light effect.

The IC 61 preferably includes a cut-off circuit that is voltage dependent. As the capacitor 57 discharges, the voltage across the cut-off circuit decreases. Once the voltage across the cut-off circuit reaches a predetermined threshold value, the cut-off circuit prevents further power being consumed by the LEDs 34A and 34B. As no power is being consumed by the light circuit 60, the capacitor 57 retains a residual charge. The residual charge maintains a voltage across the IC 61, which enables the selected color to be retained by the memory in the IC 61.

During the next day, the solar cell 30 recharges the battery 33. As night falls, the resistance of resistor 42 again increases and the battery 33 provides sufficient power to the light circuit 60 to increase the voltage across the cut-off circuit above the predetermined threshold value. The LEDs are activated and the selected color, as retained in the memory of the IC 61, is displayed. The voltage provided by the battery 33 is more than the stored charge of the fourth capacitor 57, so the capacitor 57 again begins to store charge.

It will be readily apparent to a person skilled in the art that there are many circuit variations possible for enabling and controlling the lighting display, without departing from the spirit and scope of the invention.

The switch 40 and/or switch 65 is/are mounted on the base 26 so as to be on a downwardly facing external surface of the base 26. This enables a user to control the device via readily accessible switches, without needing to remove the cap assembly 24. The switches 40 and 65 are each operable to control delivery of electric power from the batteries to the LEDs 34A and 34B. The circuit 29 is only rendered operative when there is insufficient light, that is, by operation of a light sensitive switch, i.e. the diode 43.

Figure 12:
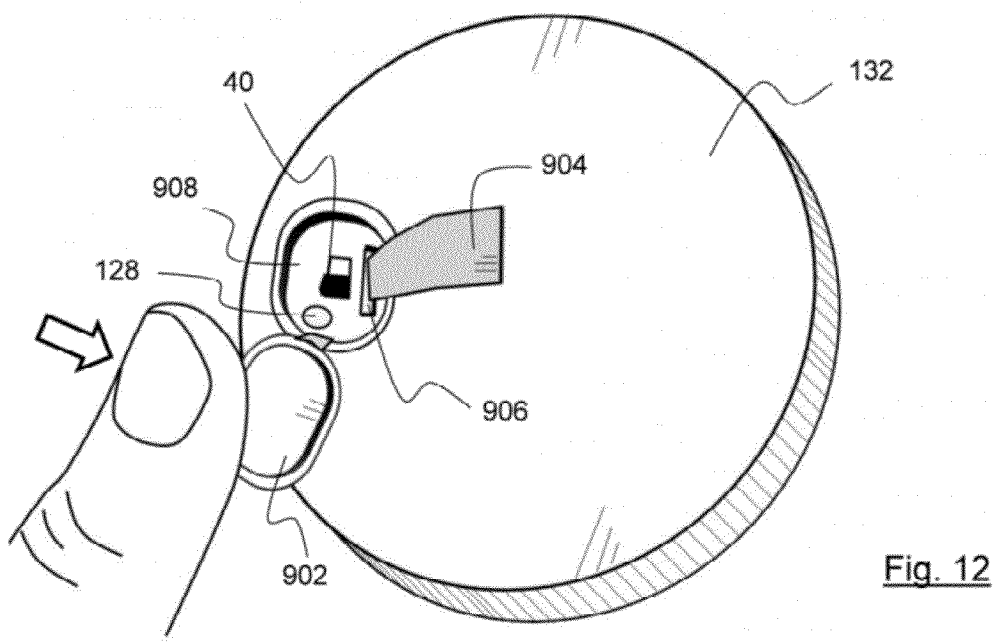
FIG. 12 is a second inverted view of a first alternative embodiment of the housing of the lighting device, in accordance with the present invention.

In the embodiments shown in FIGS. 1 to 9, a user operable switch 40 (and more specifically shown in FIG. 3) is accessible to a user via the lower external surface 132 of the lower housing base 132 of the housing 110. The switch 40 is interposed between the batteries and the light source 123, enabling a user to optionally turn off the lighting element assembly regardless of the output of the light sensor 128. The user operable switch 40 may also have multiple functions such as to enable a user to change the light source that is illuminated from one color or group of colors to a second color or group of colors. Preferably the switch 40 is a push switch covered by a waterproof gasket. An alternate switching structure is disclosed in FIGS. 12 and 13.

Referring to FIG. 4, the dotted circular representations 404 illustrates regions of a ground substrate 402 such as a pathway 406 that are well illuminated by several units of the lighting device 100 when installed in the ground substrate 402 adjacent to a path way 406. In addition, the lens 104 may also be illuminated by the utilization of partially light transmissive material in the lens 104 such as frosted glass where some of the light from the light source 123 passes through the lens 104 and illuminates the ground substrate 402 and pathway 406 and some of the light from the light source 123 illuminates the lens 104 so that it is visible 408 by a user walking past the lighting device 100 when installed.

Figure 8:
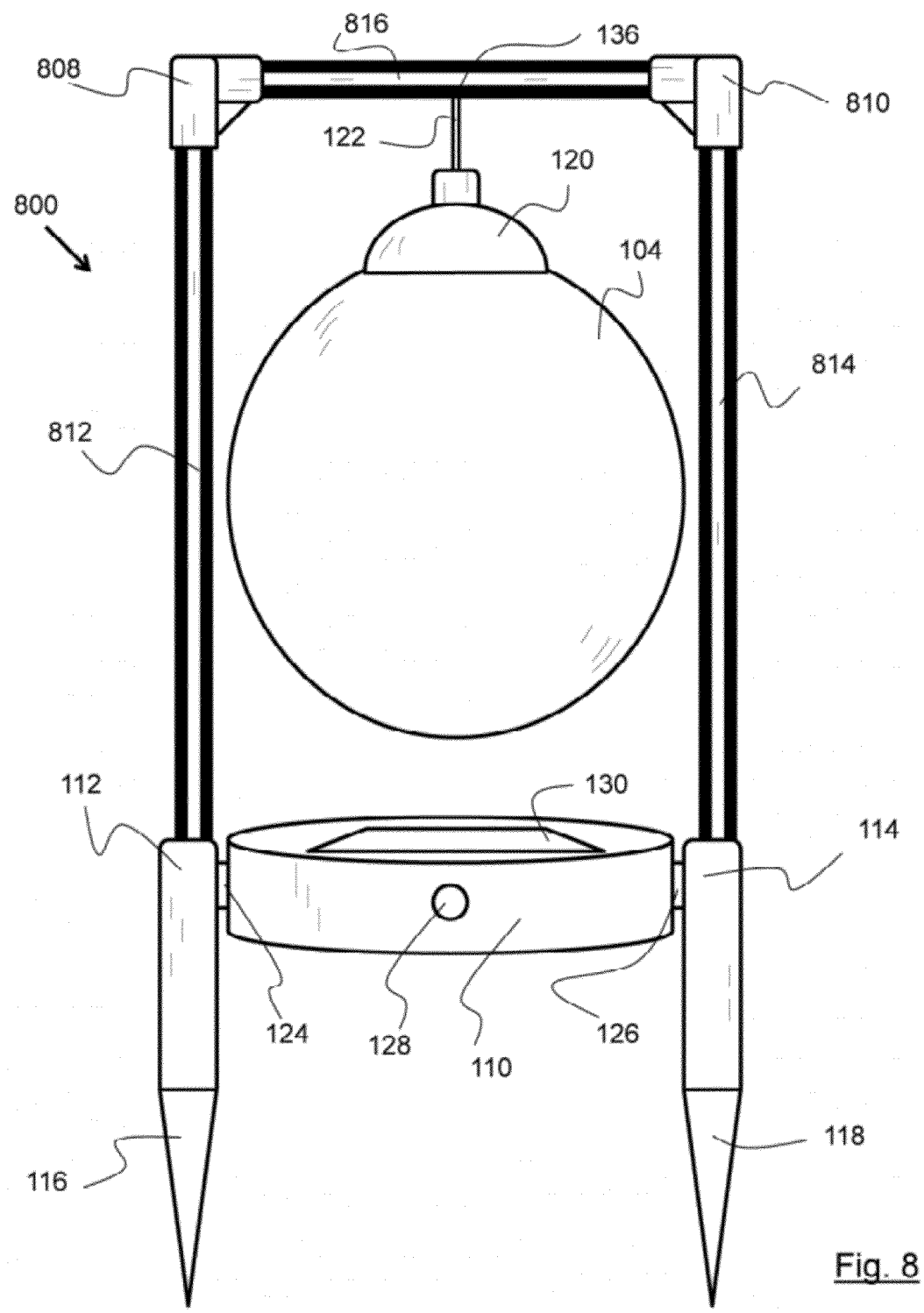
FIG. 8 is a first perspective view of a third embodiment of the lighting device, in accordance with the present invention.

FIGS. 8 and 9 show an alternative structural embodiment 800 of the present invention. Unlike in the embodiments shown in FIGS. 1 to 7, which show a curved connection frame 108 that is preferably integral with the first upper support post 102 and second upper support post 106, the embodiments of FIGS. 8 and 9 employ straight tubular sections for support. Specifically, it shows a substantially vertically-oriented first support pole 812 substantially parallel to a vertically-oriented second support pole 814 with a horizontal cross support pole 108 there between providing rigidity, support and spacing for the lighting device 800. In an alternate embodiment the cross support pole 108 is constructed of two parts and has a central joining region connected by a mating adaptor. Connecting and securing the first support pole 812 to the cross-support pole 816 is a first upper joining member 808. Connecting and securing the second support pole 814 to the cross-support pole 816 is a second upper joining member 810. The first and second upper joining members 808 and 810 are preferably constructed from injected thermoplastic such as glass filled nylon or polypropylene and preferably connect to the support poles 812, 814 and 816 via press-fit created by slight expansion of the thermoplastic and slight inward deformity of the tubular support poles. The first and second upper joining members 808 and 810 each have two apertures which have a shape and width corresponding to the external diameter and shape of the respective support poles 812 and 814 and 816 which are inserted into the apertures and press-fit. Preferably the support poles 812, 814 and 816 are made from stainless steel hollow tubing and cut to length. The cross support pole 816 may be straight, curved, or have a non-deterministic ornamental shape. Suspended below the cross support pole 816 via a lens suspender 122 is a lens frame 120 supporting a lens 104.

The lower ends of the first support pole 812 and the second support pole are insertable into the respective lower support posts 116 and 114 which in this embodiment are integral with the respective ground stakes 116 and 118. The first and second lower support posts 112 and 114 are preferably constructed from injected thermoplastic such as glass filled nylon or polypropylene and preferably connect to the support poles 812 and 814 via press-fit created by slight expansion of the thermoplastic of the lower support posts 112 and 114 and by slight inward deformity of the tubular support poles. The first and second lower support posts 112 and 114 each have an upper aperture which have a shape and width corresponding to the external diameter and shape of the respective support poles 812 and 814 which are inserted into the apertures and press-fit. The housing first support 124 and 126 housing second support are preferably integrally molded to the respective lower support posts 112 and 114. Alternatively, The housing first support 124 and 126 housing second support are integrally molded to the housing 100. The connection of the housing 110, the housing first support 124, and housing second support 126 to the first support pole 812 and second support pole 814 creates a second lateral structural support for the light device 800 and prevents the first support pole 812 and second support pole 814 from moving apart in an unintended manner during insertion or use. It also provides rigidity and stability to the overall frame of the lighting device 800.

In many gardens, the housing 132 is located in a commonly wet and moist environment, exposed to precipitation, garden hoses and irrigation sprinklers. If the circuitry within the housing 132 is exposed to moisture over time it will corrode and or rust causing failure of the lighting device 100. It is thus important for product longevity that the surfaces of the housing 132 does not have openings or aperture where water and ambient moisture will enter the housing 132.

In an alternate version of the embodiment shown in FIG. 9, the lens 104 is made of injected plastic with an etched design that simulates a sand-blasted stencil process applied to glass. In a further alternate embodiment the lens has a smooth surface and a water transfer film and coating applied to an outer surface of the lens 104 simulate various glass structures and finishes such as crackle glass, hand blown single or multi-colored glass, mosaic glass or stenciled glass. Instead of water transfer printing, sometimes known as cubic printing, a decal sticker or heat shrink film applied to the lens 104 may be secured via a thermal bonding process such as in an oven of via use of a hot air blower. These embodiments allowing the use of a plastic lens have a lower breakage risk from transportation and impact than an embodiment made of glass, a lower weight and a lower center of gravity than glass lens structures. Although they will likely be perceived as less attractive than glass they will have a lower cost packing and presentation such as a PDQ display or "Presentation Display Quantity" display that requires a minimal amount of unpacking to and in the merchandising execution at a retail store level whereby the lens is not enclosed within any packaging and is fully exposed to the shopper.

FIGS. 11, 12, 13 and 14 shows inverted view of an alternative embodiment of the housing 132. Disposed on the lower surface of the housing 132 is a recessed partially oval shaped access region 908 which is preferably recessed in the lower surface of the housing 132 is a resilient cap 902 preferably affixed by a tether to the housing 132 at one end to avoid the cap 902 becoming lost or dropped during use. The access region 908 preferably has side walls and a rim to snugly and securely mate with the resilient cap 902 when the resilient cap 902 is pressed by a user into the access region 908. The resilient cap 902 is preferable made of an at least partially light transmissive material such as polyvinylchloride (PVC) or silicon rubber.

Figure 11:
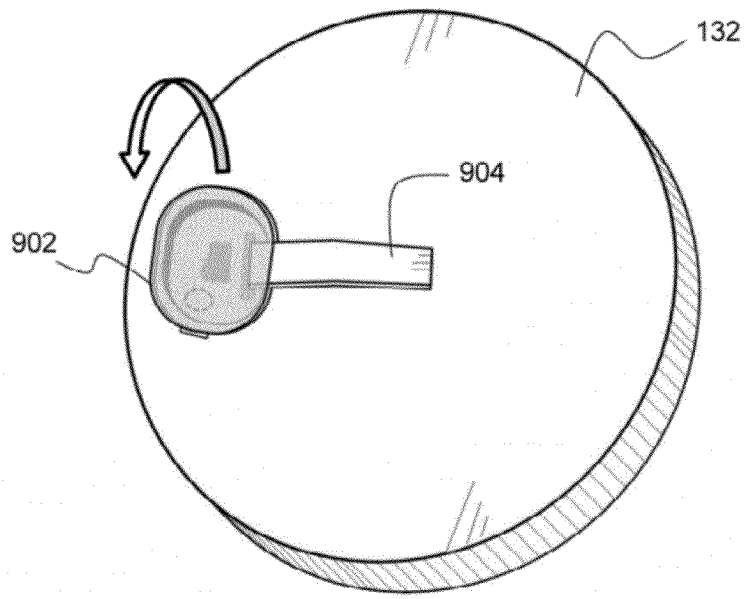
FIG. 11 is a first inverted view of a first alternative embodiment of the housing of the lighting device of FIG. 1, in accordance with the present invention.

As shown in FIG. 11, when the user remove the new lighting device 100 from its packaging after purchase, a flexible pull tab 904 extends from beneath the closed cap 902. There may be indicia or words printed on the pull tab 904 to instruct the user such as "Open cap, Pull tab to activate, close cap before use". Because the pull tab 904 extends beneath the visible portion of the cap 902, it is apparent to a user to access the access region 908 by removing the cap 902 from its position mated to the access region 908. The pull tab 904 acts as an insulator between a rechargeable battery 304 and internal battery connections that connect the battery 304 via circuitry to the electrical light source or sources 123. When the pull tab 904 is removed, with any optional switch in an "ON" position, and the ambient light levels are low, an electrical connection is made between the battery 304 and the battery connections (not shown) and then the lighting device 100 will function normally for normal use. In the embodiment shown in FIGS. 12 and 13 a switch 40 is co-located in the access region 908. This switch 40 may have the function of switching between various lighting modes or light sources. For example, the switch 40 may be a two position single pole slide switch with one position putting the lighting device 100 into a mode whereby only a single color of light is emitted by the lighting device 100 such as white light. In the second position, the lighting device 100 would be put into a mode whereby a continuous cycle of changing colors is emitted by the lighting device 100. Alternatively the switch 40 may be a push switch or a rotational switch.

Alternatively, instead of being located on a vertical side of the housing 110, the ambient light sensor 128 may be located on the lower surface of the housing 132 within the access region 908. Since the cap 902 is light transmissive, the ambient light sensor 128 is able to operate from beneath the cap 902 when the cap 902 is mated with the access region 908.

Figure 13:
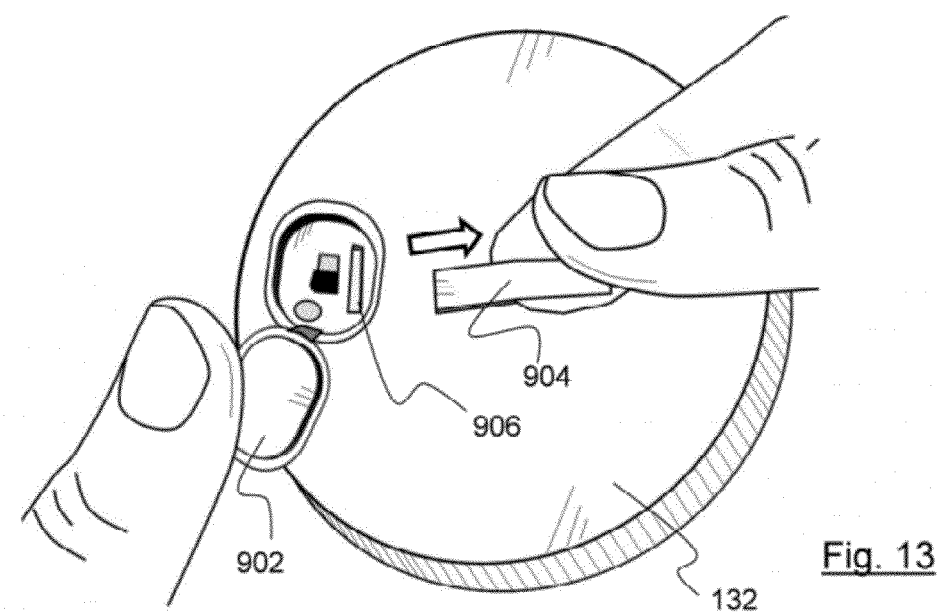
FIG. 13 is a third inverted view of a first alternative embodiment of the housing of the lighting device, in accordance with the present invention.

As shown in FIG. 13, the user, as instructed, removes the new lighting device 100 from its packaging after purchase, pulls on the pull tab 904 and removes it from the slotted aperture 906 located in the access region 908.

Figure 14:
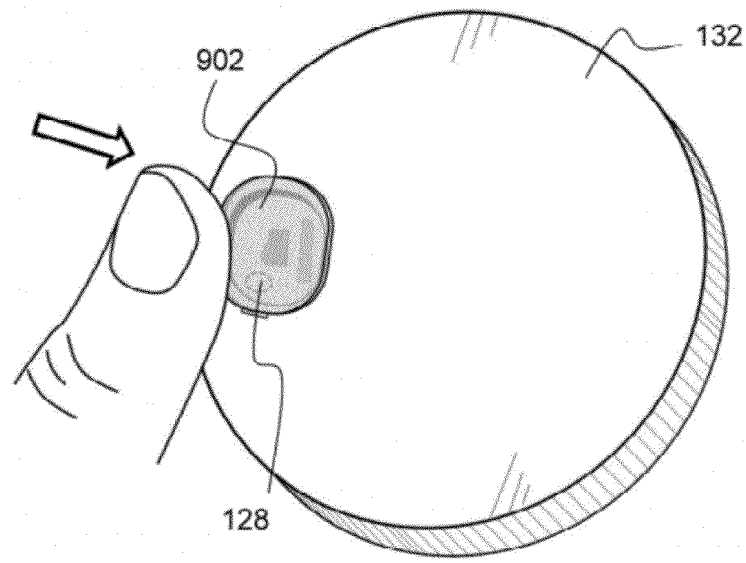
FIG. 14 is a fourth inverted view of a first alternative embodiment of the housing of the lighting device, in accordance with the present invention.

As shown in FIG. 14, the user then places the cap 902 over the access region 908 and pushes the cap 902 securely into place over the activity region. With the cap 902 in place, the seal between the cap 902 and the access region 908 is substantially resistant to moisture ingress. This means that the aperture for the optional switch 40, the aperture for the pull tab 906, and the aperture for the ambient light sensor 128 are substantially waterproofed from moisture when the cap 902 is mated to the access region 908 in the in the lower surface of the housing 132. This configuration allows the use of the pull tab 904 in the packaging of the lighting device 100. Further, the pull tab may be electrically conductive on two sides and connected to a package switch as disclosed in copending U.S. patent application Ser. No. 12/236,340, now U.S. Pat. No. 8,104,914, entitled, "A Light Device", filed on Sep. 9, 2008, the contents of which are hereby incorporated by reference in their entirety.

Although the invention has been described in language specific to structural features and/or methodological acts, it is to be understood that the invention defined herein is not necessarily limited to the specific features or acts described. Rather, the specific features and acts are disclosed as exemplary forms of implementing the claimed invention.

What is claimed is:

1. A lighting device comprising:
at least one generally inverted-U-shaped support comprising free-ends spaced apart and attached to a base, said support having generally vertical riser sections connected together by an upper joining section which orients and spaces apart said free-ends;
a light assembly suspended below said upper joining section of said generally inverted-U-shaped support and suspended between said riser sections;
a power supply assembly comprising:
a housing positioned between said light assembly and said base,
at least one photovoltaic panel mounted proximate to an upper surface of said housing so as to receive sunlight,
at least one rechargeable battery;
wherein said light assembly and said power supply assembly are electrically connected; and
wherein emitted light from said light assembly illuminates a portion of said upper surface of said housing during night-time use.

2. The lighting device of claim 1, wherein said light assembly includes:
an at least partly light-transmissive lens suspended below an upper portion of said generally inverted-U-shaped support and suspended between said riser sections;
at least one light source electrically connected to said power supply assembly; and
wherein emitted light from said light source is directed substantially downwards through a portion of said lens; and
wherein said emitted light is at least partially reflected by said upper surface of said housing to redirect some reflected light upwards towards a downward-facing surface of said lens.

3. The lighting device of claim 2, wherein said lens comprises an at least partially convex upper surface and a lower opposing surface forming an at least partially enclosed cavity.

4. The lighting device of claim 2, wherein said housing has electrical elements connected to said at least one light source via at least one of said substantially vertical riser sections.

5. The lighting device of claim 4, wherein said housing laterally connects to both of said substantially vertical riser sections to provide lateral structural support to said lighting device.

6. The lighting device of claim 1, wherein said housing is at least partly rotatable between said two substantially vertical riser sections to adjust the angle of said at least one photovoltaic panel relative to said base.

7. The lighting device of claim 1, wherein said generally inverted-U-shaped support is substantially comprised of a single tube of metal bent into an arch and electrical leads that pass through a hollow interior of said tube between said light assembly and said power supply assembly.

8. The lighting device of claim 7, further comprising tip portions attached to said tube.

9. The lighting device of claim 1, wherein said generally inverted-U-shaped support is substantially comprised of:
a substantially vertically-oriented first support pole;
a substantially vertically-oriented second support pole substantially parallel to said substantially vertically-oriented first support pole;
a substantially horizontal cross support pole connecting said substantially vertically-oriented first support pole and said substantially vertically-oriented second support pole; and
wherein said light assembly is suspended below said substantially horizontal cross support pole.

10. The lighting device of claim 2, further comprising a control circuit including:
a light-sensing sub-circuit connected such that said at least one rechargeable battery accumulates electrical charge when said at least one photovoltaic panel is exposed to ambient light level of sufficient intensity; and
a light-activation sub-circuit wherein when said light sensing sub-circuit detects ambient light lower than a predetermined level, said control circuit connects said rechargeable battery and said at least one light source via an electrical connection such that said at least one light source emits light downward towards and around said at least one photovoltaic panel and wherein said light-activation sub-circuit includes a light sensitive resistor that is shielded from said emitted light.

11. The lighting device of claim 1, wherein said light assembly is flexibly suspended below said upper joining section and is at least partially movable relative to said support.

12. The lighting device of claim 1, wherein said housing further comprises:
an access region comprising a slotted aperture for a pull tab; and a cap to cover said access region to provide a substantially water-resistant seal between said cap and said access region when said cap is mated to said access region.

13. The lighting device of claim 12 wherein said access region further comprises a switch.

14. The lighting device of claim 12, wherein said cap includes a tether connected to said housing.

15. The lighting device of claim 8, wherein said base is displaceable substrate and said tips are adapted to penetrate and anchor to said substrate.

16. The lighting device of claim 1, including a plurality of supports connected at upper joining sections.

17. The lighting device of claim 11, including:
a lateral member connected between said riser sections and below said light assembly; and wherein (1) said support, (2) at least two of said free-ends connected to said base, (3) said lateral member and (4) movement of said light assembly relative to said support, each and in any combination thereof, provides said lighting device with a capability to sustain an impact with reduced damage and displacement.

18. A lighting device comprising:
at least two vertically-oriented supports;
each support adapted at one end for supporting an upper section above a substrate;
a light source electrically connected to said upper section;
a lens wherein light emitted from said light source is directed partly through said lens;
a housing mounted between a first upper region and a first lower region of said at least two vertically-oriented supports, said housing comprising:
  at least one solar panel mounted proximate to an upper surface of said housing so as to receive light,
  at least one rechargeable battery,
  a control circuit comprising:
    a light-sensing sub-circuit connected such that said at least one rechargeable battery accumulates electrical charge when said solar panel is exposed to ambient light level of sufficient intensity; and
    a light-activation sub-circuit wherein when said light sensing sub-circuit detects ambient light lower than a predetermined level said control circuit connects said rechargeable battery and said light source via an electrical connection such that said light source emits light; and
  an access region on a lower surface of said housing comprising a slotted aperture for a pull tab; and
  a translucent cap to cover said access region to provide a substantially water-resistant seal between said cap and said access region when said cap is mated to said access region.

19. The lighting device of claim 18 wherein said light-activation sub-circuit includes a light sensitive resistor that is shielded from light emitted by said light source; and wherein said access region further comprises an aperture to allow light reach said light sensitive resistor.

20. The lighting device of claim 18 wherein said access region further comprises a switch.

21. The lighting device of claim 18 wherein a free end of said pull tab further comprises a switch that is electrically connected between said light source and said battery.

22. A light device comprising:
a safety barrier comprising two substantially vertical riser posts and an upper portion there between for supporting said safety barrier above a ground substrate;
an at least partly light-transmissive lens flexibly suspended below an upper portion of said safety barrier and suspended between said riser posts; and wherein said lens is movable about a vertical central axis such that the outer surface of said lens can be moved to a position where said riser posts protect said lens from impact damage,
at least one light source electrically connected to said upper portion;
wherein emitted light from said at least one light source is directed substantially downwards through a portion of said lens;
a housing mounted to said safety barrier and positioned between said lens and said around substrate, said housing comprising:
  at least one photovoltaic panel mounted proximate to an upper surface of said housing so as to receive sunlight,
  at least one rechargeable battery;
an electrical connection between said rechargeable battery and said at least one light source to power said at least one light source; and
wherein said emitted light from said lens illuminates a portion of said upper surface of said housing during night-time use.

23. The light device of claim 22 wherein said substantially vertical riser posts and said upper portion comprise a substantially inverted-U-shaped support.

24. The light device of claim 22, wherein said emitted light is at least partially reflected by said upper surface of said housing to redirect some reflected light upwards towards a downward-facing surface of said lens.

25. The light device of claim 22, wherein said housing laterally connects to both of said substantially vertical riser posts to provide increased structural rigidity to said safety barrier.

* * * * *